US008745607B2

(12) United States Patent
Valluri et al.

(10) Patent No.: US 8,745,607 B2
(45) Date of Patent: Jun. 3, 2014

(54) REDUCING BRANCH MISPREDICTION IMPACT IN NESTED LOOP CODE

(75) Inventors: Madhavi G. Valluri, Austin, TX (US); Steven W. White, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 214 days.

(21) Appl. No.: 13/294,271

(22) Filed: Nov. 11, 2011

(65) Prior Publication Data

US 2013/0125104 A1 May 16, 2013

(51) Int. Cl.
*G06F 9/45* (2006.01)

(52) U.S. Cl.
USPC ........... 717/160; 717/150; 717/151; 717/154; 717/159

(58) Field of Classification Search
None
See application file for complete search history.

(56) References Cited

U.S. PATENT DOCUMENTS

| | | | | |
|---|---|---|---|---|
| 5,797,013 | A * | 8/1998 | Mahadevan et al. | 717/160 |
| 6,035,125 | A * | 3/2000 | Nguyen et al. | 717/160 |
| 6,192,515 | B1 * | 2/2001 | Doshi et al. | 717/161 |
| 6,341,371 | B1 * | 1/2002 | Tandri | 717/158 |
| 6,567,976 | B1 * | 5/2003 | Wolf | 717/160 |
| 6,938,249 | B2 * | 8/2005 | Roediger et al. | 717/160 |
| 7,086,043 | B2 * | 8/2006 | Roediger et al. | 717/150 |
| 7,140,009 | B2 | 11/2006 | Tal et al. | |
| 7,428,731 | B2 * | 9/2008 | Wu et al. | 717/158 |
| 7,631,305 | B2 * | 12/2009 | Rong et al. | 717/161 |
| 7,945,768 | B2 * | 5/2011 | Essick et al. | 712/241 |
| 8,087,010 | B2 * | 12/2011 | Eichenberger et al. | 717/150 |
| 8,087,011 | B2 * | 12/2011 | Eichenberger et al. | 717/151 |
| 8,156,284 | B2 * | 4/2012 | Vorbach et al. | 711/118 |
| 2004/0015916 | A1 * | 1/2004 | Click et al. | 717/150 |
| 2006/0158354 | A1 * | 7/2006 | Aberg et al. | 341/50 |
| 2007/0083730 | A1 * | 4/2007 | Vorbach et al. | 712/10 |
| 2009/0158247 | A1 * | 6/2009 | Tal | 717/106 |
| 2010/0107147 | A1 * | 4/2010 | Cha | 717/161 |
| 2010/0153654 | A1 * | 6/2010 | Vorbach et al. | 711/137 |
| 2010/0306300 | A1 * | 12/2010 | Lu et al. | 708/520 |
| 2011/0055819 | A1 * | 3/2011 | Doyle et al. | 717/156 |
| 2011/0167416 | A1 * | 7/2011 | Sager et al. | 717/149 |
| 2011/0238948 | A1 * | 9/2011 | Vorbach et al. | 712/15 |
| 2012/0036138 | A1 * | 2/2012 | Carrion | 707/748 |
| 2013/0125104 | A1 * | 5/2013 | Valluri et al. | 717/160 |
| 2013/0166886 | A1 * | 6/2013 | Sasanka et al. | 712/216 |

FOREIGN PATENT DOCUMENTS

| | | | | | |
|---|---|---|---|---|---|
| WO | WO 2012/143760 | * | 4/2011 | | G06F 9/44 |
| WO | WO 2012/143760 A1 | * | 4/2011 | | G06F 9/06 |

* cited by examiner

*Primary Examiner* — Don Wong
*Assistant Examiner* — Hossain Morshed
(74) *Attorney, Agent, or Firm* — James L. Baudino; Matthew W. Baca

(57) ABSTRACT

According to one aspect of the present disclosure, a method and technique for reducing branch misprediction impact for nested loop code is disclosed. The method includes: responsive to identifying code having an outer loop and an inner loop, determining a quantity of iterations of the inner loop for an initial number of iterations of the outer loop; determining a number of processor cycles for executing the quantity of iterations of the inner loop for the initial number of iterations of the outer loop; determining whether the number of processor cycles is less than a threshold; and responsive to determining that the number of processor cycles is less than the threshold, fully unrolling the inner loop for the initial number of iterations of the outer loop.

20 Claims, 8 Drawing Sheets

```
loop begin i = 1:N
    loop begin j = 1:i
        ....
        ....
    endloop j
endloop i
```

```
DO 40 MK=1, NOC
   DO 30 ML=1, MK
      MKL = MKL + 1
         XPQKL (MPQ,MKL ) = XPQKL (MPQ,MKL ) +
*                 VAL1*(CO(MS,MK)*CO(MR,ML)+CO(MS,ML)*CO(M R,MK))
         XPQKL(MRS,MKL) = XPQKL(MRS,MKL) +
*                 VAL3*(CO(MQ,MK)*CO(MP,ML)+CO(MQ,ML)*CO(M P,MK))
30 CONTINUE
40 CONTINUE
```

```
    MK = 1
    ML = 1
    MKL = MKL+1
    XPQKL(MPQ,MKL) = XPQKL(MPQ,MKL) +
*          VAL1*(CO(MS,MK)*CO(MR,ML)+CO(MS,ML)*CO(MR,MK))
    XPQKL(MRS,MKL) = XPQKL(MRS,MKL) +
*          VAL3*(CO(MQ,MK)*CO(MP,ML)+CO(MQ,ML)*CO(MP,MK))
```
← 601

```
    IF (NOC.GE.2) THEN
     MK = 2
     ML = 1
     MKL = MKL+1
     XPQKL(MPQ,MKL) = XPQKL(MPQ,MKL) +
*           VAL1*(CO(MS,MK)*CO(MR,ML)+CO(MS,ML)*CO(MR,MK))
     XPQKL(MRS,MKL) = XPQKL(MRS,MKL) +
*           VAL3*(CO(MQ,MK)*CO(MP,ML)+CO(MQ,ML)*CO(MP,MK))
     ML = 2
     MKL = MKL+1
     XPQKL(MPQ,MKL) = XPQKL(MPQ,MKL) +
*           VAL1*(CO(MS,MK)*CO(MR,ML)+CO(MS,ML)*CO(MR,MK))
     XPQKL(MRS,MKL) = XPQKL(MRS,MKL) +
*           VAL3*(CO(MQ,MK)*CO(MP,ML)+CO(MQ,ML)*CO(MP,MK))
ENDIF
```
← 602

```
    IF (NOC.GE.3) THEN
     MK = 3
     ML = 1
     MKL = MKL+1
     XPQKL(MPQ,MKL) = XPQKL(MPQ,MKL) +
*           VAL1*(CO(MS,MK)*CO(MR,ML)+CO(MS,ML)*CO(MR,MK))
     XPQKL(MRS,MKL) = XPQKL(MRS,MKL) +
*           VAL3*(CO(MQ,MK)*CO(MP,ML)+CO(MQ,ML)*CO(MP,MK))
```
← 603

CONTINUES ON NEXT PAGE

FIG. 6

CONTINUED FROM PREVIOUS PAGE

```
    ML = 2
    MKL = MKL+1
    XPQKL(MPQ,MKL) = XPQKL(MPQ,MKL) +
*           VAL1*(CO(MS,MK)*CO(MR,ML)+CO(MS,ML)*CO(MR,MK))
    XPQKL(MRS,MKL) = XPQKL(MRS,MKL) +
*           VAL3*(CO(MQ,MK)*CO(MP,ML)+CO(MQ,ML)*CO(MP,MK))
    ML = 3
    MKL = MKL+1
    XPQKL(MPQ,MKL) = XPQKL(MPQ,MKL) +
*           VAL1*(CO(MS,MK)*CO(MR,ML)+CO(MS,ML)*CO(MR,MK))
    XPQKL(MRS,MKL) = XPQKL(MRS,MKL) +
*           VAL3*(CO(MQ,MK)*CO(MP,ML)+CO(MQ,ML)*CO(MP,MK))
ENDIF

IF (NOC.GE.4) THEN
    MK = 4
    ML = 1
    MKL = MKL+1
    XPQKL(MPQ,MKL) = XPQKL(MPQ,MKL) +
*           VAL1*(CO(MS,MK)*CO(MR,ML)+CO(MS,ML)*CO(MR,MK))
    XPQKL(MRS,MKL) = XPQKL(MRS,MKL) +
*           VAL3*(CO(MQ,MK)*CO(MP,ML)+CO(MQ,ML)*CO(MP,MK))
    ML = 2
    MKL = MKL+1
    XPQKL(MPQ,MKL) = XPQKL(MPQ,MKL) +
*           VAL1*(CO(MS,MK)*CO(MR,ML)+CO(MS,ML)*CO(MR,MK))
    XPQKL(MRS,MKL) = XPQKL(MRS,MKL) +
*           VAL3*(CO(MQ,MK)*CO(MP,ML)+CO(MQ,ML)*CO(MP,MK))
    ML = 3
    MKL = MKL+1
    XPQKL(MPQ,MKL) = XPQKL(MPQ,MKL) +
*           VAL1*(CO(MS,MK)*CO(MR,ML)+CO(MS,ML)*CO(MR,MK))
    XPQKL(MRS,MKL) = XPQKL(MRS,MKL) +
*           VAL3*(CO(MQ,MK)*CO(MP,ML)+CO(MQ,ML)*CO(MP,MK))
```

← 603

← 604

CONTINUES ON NEXT PAGE

FIG. 6

CONTINUED FROM PREVIOUS PAGE $ML = 4$
$MKL = MKL+1$
$XPQKL(MPQ,MKL) = XPQKL(MPQ,MKL) +$
* $VAL1*(CO(MS,MK)*CO(MR,ML)+CO(MS,ML)*CO(MR,MK))$
$XPQKL(MRS,MKL) = XPQKL(MRS,MKL) +$
* $VAL3*(CO(MQ,MK)*CO(MP,ML)+CO(MQ,ML)*CO(MP,MK))$
ENDIF

— 604

IF (NOC.GE.5) THEN
$MK = 5$
$ML = 1$
$MKL = MKL+1$
$XPQKL(MPQ,MKL) = XPQKL(MPQ,MKL) +$
* $VAL1*(CO(MS,MK)*CO(MR,ML)+CO(MS,ML)*CO(MR,MK))$
$XPQKL(MRS,MKL) = XPQKL(MRS,MKL) +$
* $VAL3*(CO(MQ,MK)*CO(MP,ML)+CO(MQ,ML)*CO(MP,MK))$

— 605

$ML = 2$
$MKL = MKL+1$
$XPQKL(MPQ,MKL) = XPQKL(MPQ,MKL) +$
* $VAL1*(CO(MS,MK)*CO(MR,ML)+CO(MS,ML)*CO(MR,MK))$
$XPQKL(MRS,MKL) = XPQKL(MRS,MKL) +$
* $VAL3*(CO(MQ,MK)*CO(MP,ML)+CO(MQ,ML)*CO(MP,MK))$
$ML = 3$
$MKL = MKL+1$
$XPQKL(MPQ,MKL) = XPQKL(MPQ,MKL) +$
* $VAL1*(CO(MS,MK)*CO(MR,ML)+CO(MS,ML)*CO(MR,MK))$
$XPQKL(MRS,MKL) = XPQKL(MRS,MKL) +$
* $VAL3*(CO(MQ,MK)*CO(MP,ML)+CO(MQ,ML)*CO(MP,MK))$
$ML = 4$
$MKL = MKL+1$
$XPQKL(MPQ,MKL) = XPQKL(MPQ,MKL) +$
* $VAL1*(CO(MS,MK)*CO(MR,ML)+CO(MS,ML)*CO(MR,MK))$
$XPQKL(MRS,MKL) = XPQKL(MRS,MKL) +$
* $VAL3*(CO(MQ,MK)*CO(MP,ML)+CO(MQ,ML)*CO(MP,MK))$

CONTINUES ON NEXT PAGE

FIG. 6

REDUCING BRANCH MISPREDICTION IMPACT IN NESTED LOOP CODE

BACKGROUND

Generating computer code that is efficiently processed (i.e., "optimized") is an important goal in software design and execution. Source code (i.e., that code which is in human readable form) is typically converted into object code, and thereafter an executable application by use of a compiler. One common structure found in source code is a loop. Nested loops, or a loop within a loop, are also common structures. Loops are used to repeat one or more operations or instructions. Loops may be characterized by a loop header, loop body and a branch back to the top of the loop. Compilers generally perform various "optimization" techniques on the looped code to improve processor execution time of the looped instructions, such as loop unrolling, loop fusion, etc.

BRIEF SUMMARY

According to one aspect of the present disclosure a method and technique for reducing branch misprediction impact in nested loop code is disclosed. The method includes: responsive to identifying code having an outer loop and an inner loop, determining a quantity of iterations of the inner loop for an initial number of iterations of the outer loop; determining a number of processor cycles for executing the quantity of iterations of the inner loop for the initial number of iterations of the outer loop; determining whether the number of processor cycles is less than a threshold; and responsive to determining that the number of processor cycles is less than the threshold, fully unrolling the inner loop for the initial number of iterations of the outer loop.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 4 is a diagram illustrating an exemplary nested loop code structure that may be optimized in accordance with the present disclosure;

FIG. 5 is a diagram illustrating another exemplary nested loop code structure that may be optimized in accordance with the present disclosure;

DETAILED DESCRIPTION

Figure 1:
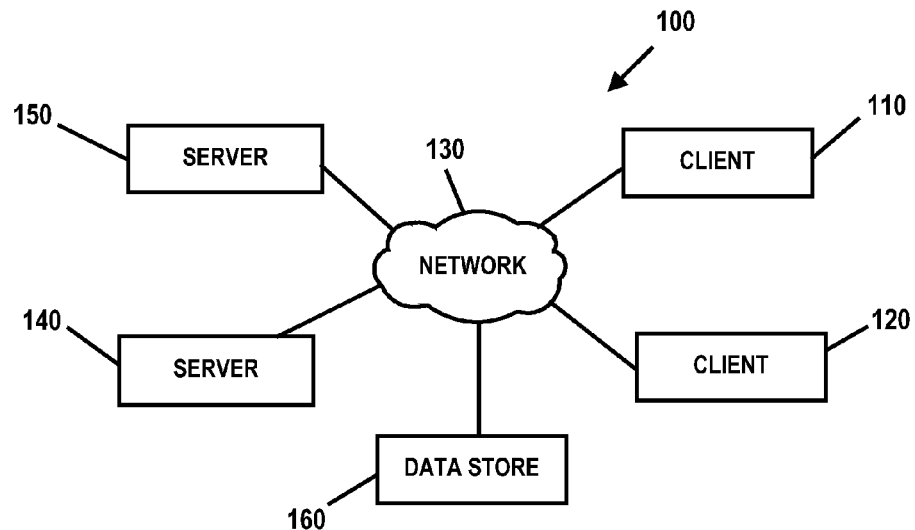
FIG. 1 is an embodiment of a network of data processing systems in which the illustrative embodiments of the present disclosure may be implemented.

Embodiments of the present disclosure provide a method, system and computer program product for reducing branch misprediction impact in nested loop code. For example, in some embodiments, the method and technique includes: responsive to identifying code having an outer loop and an inner loop, determining a quantity of iterations of the inner loop for an initial number of iterations of the outer loop; determining a number of processor cycles for executing the quantity of iterations of the inner loop for the initial number of iterations of the outer loop; determining whether the number of processor cycles is less than a threshold; and responsive to determining that the number of processor cycles is less than the threshold, fully unrolling the inner loop for the initial number of iterations of the outer loop. Thus, in some embodiments of the present disclosure, branch misprediction impact associated with nested code is reduced or avoided by identifying inner loops that have a generally small number of iterations for an initial quantity of iterations of the outer loop and fully unrolling the inner loop for the initial quantity of outer loop iterations. The unroll factor for unrolling the inner loop may be based on the number of instructions and execution workload for executing the inner loop instructions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
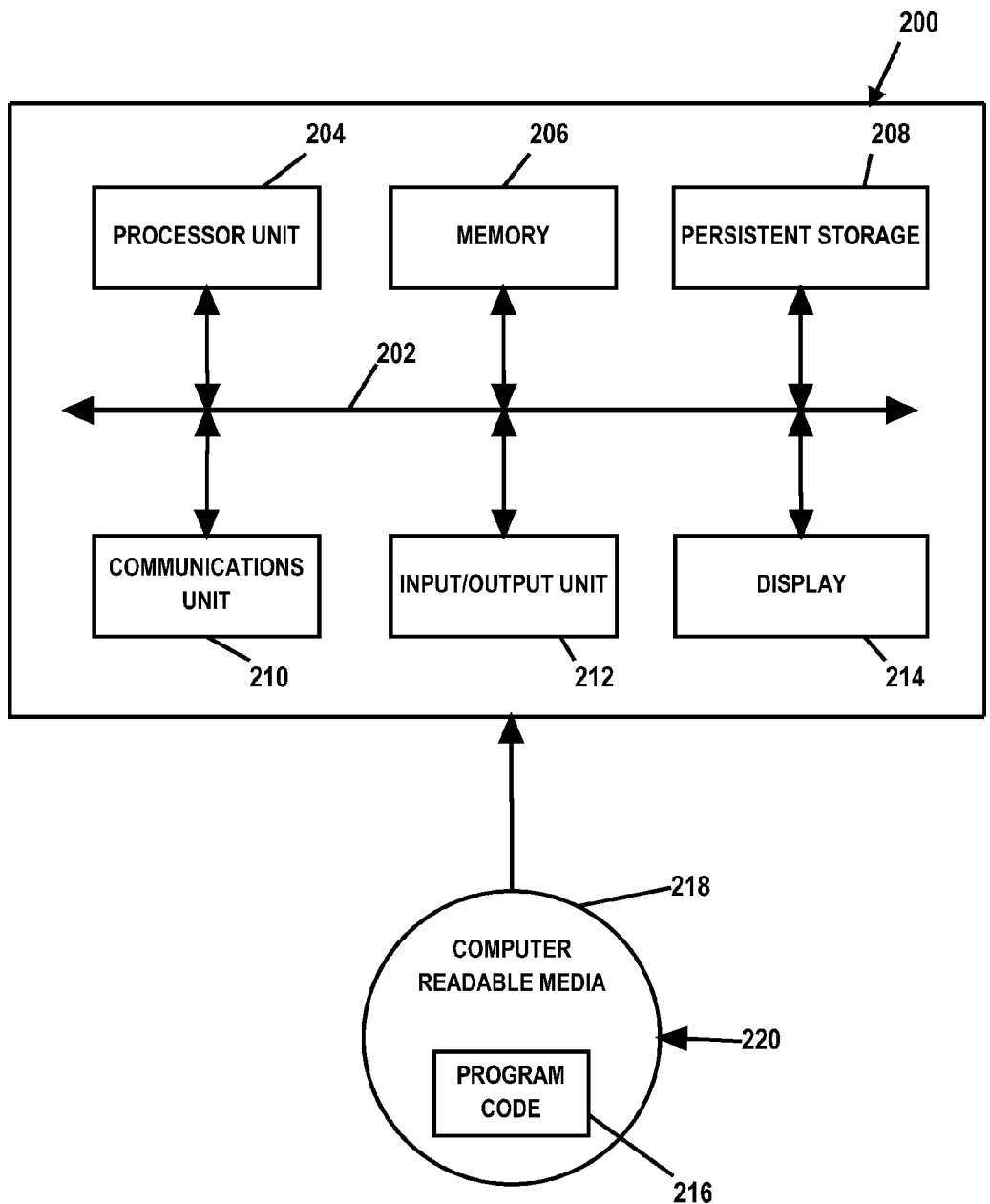
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. Server 140 and server 150 may be, for example, IBM System p® servers. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of a system for reducing a branch misprediction impact in nested loop code according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
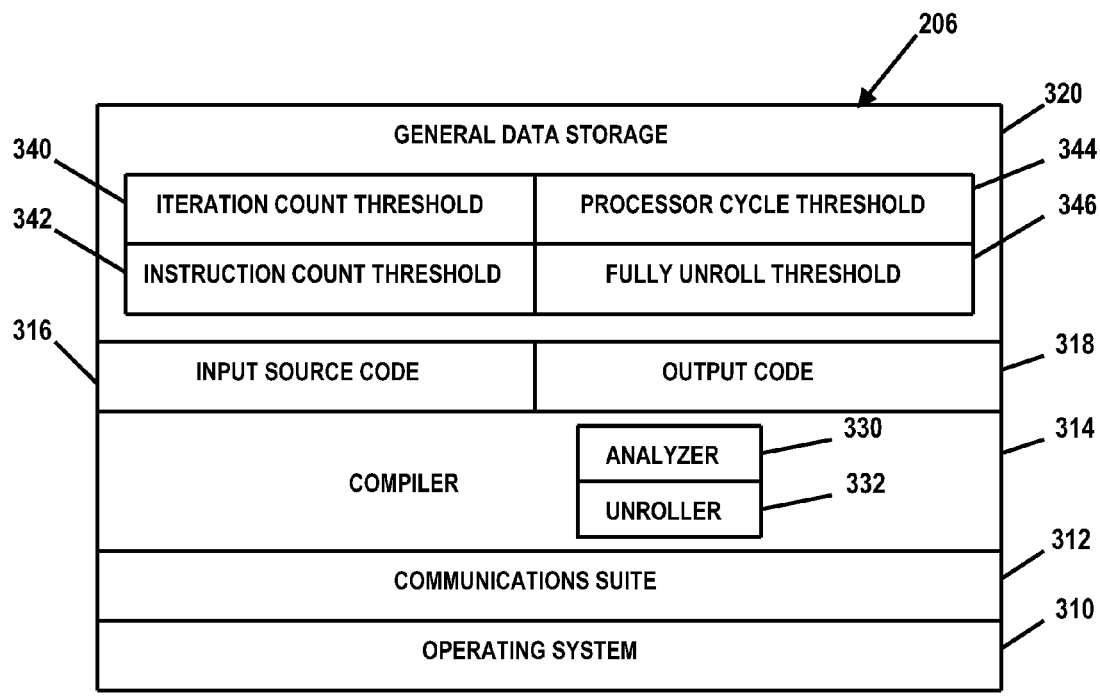
FIG. 3 is a diagram illustrating an embodiment of a portion of the data processing system of FIG. 2.

FIG. 3 is an illustrative embodiment of a portion of data processing system 200 of FIG. 2. Computer instructions/applications stored may be stored in memory 206 and executed by processor unit 204 (FIG. 2). In FIG. 3, memory 206 stores an operating system (OS) 310, a communications suite 312, a compiler 314, an input source file or input source code 316, output code 318, and a general data storage area 320. OS 310 is an operating system suitable for operation with processor unit 204. Communications suite 312 provides, via interaction with OS 310 and/or other interface devices, communication protocols to enable communications with other networked devices. Compiler 314 receives input source code 316 and generates output code 318. Compiler 314 may be implemented in any suitable manner that may be hardware-based, software-based, or some combination of both. For example, compiler 314 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system). In some embodiments, compiler 314 is software (e.g., a set of instructions and/or an algorithm) that, when executed by processor unit 204 receives input source code 316 and generates output code 318.

In the embodiment illustrated in FIG. 3, compiler 314 includes an analyzer 330 and an unroller 332. Unroller 332 performs loop unrolling based on a determined number of optimized loop unrolling times and/or loop unrolling methods as determined by analyzer 330. Analyzer 330 analyzes input source code 316 to determine and/or perform various optimization procedures or operations to improve run-time performance of a program or application. For example, analyzer 330 may identify nested loop code (i.e., a loop within a loop where each loop repeats one or more operations or instructions) and perform various optimization procedures. A particular loop may repeat operations according to an induction variable that changes for each iteration. For example, loops are common programming structures which are characterized by a loop header, loop body and a branch back to the top of the loop. The instructions in the loop body are executed and the branch at the end of the loop will branch back to the header of the loop until a certain condition is reached (e.g., the loop has been iterated a desired number of times). At that point, the branch will "fallthrough" (i.e. not redirect program control to the header of the loop) to the instruction after the loop. In microprocessors, instructions can be fetched efficiently from memory and fed to the processor front-end if they are sequential. However, when there is a change in control flow of the program (i.e., instructions have to be fetched from a non-sequential location in the memory hierarchy), there is a multi-cycle penalty incurred. The penalty may be particularly large in highly pipelined processors. The new location from which instructions need to be fetched is not known until the branch instruction flows through the many stages of the processor pipeline and it is finally executed. In the execution of the loop, the non-sequential flow of instructions from the branch instruction to the loop header can cause a multi-cycle penalty.

Microprocessors may employ branch prediction in the form of a hardware mechanism to predict the outcome of a conditional branch instruction in order to hide the penalty incurred due to branch instructions. Branch predictor hardware typically includes a prediction table which stores the history of the branch (i.e., it stores whether a branch was "taken" or "not-taken" the last time it was seen). Some complex predictors will build additional history into the tables and store information on whether the branch was taken or not-taken the last few times it was encountered. On the last iteration of the loop, the branch history tables will indicate that the branch should be taken; however, in operation, it is not taken and falls through (i.e. the branch is mispredicted). A mispredicted branch can be expensive costing many processor cycles. The penalty due to this last misprediction, especially in loops with small iteration counts and short loop bodies, can degrade performance considerably.

Embodiments of the present disclosure reduce and/or avoid the penalty seen due to mispredicted loop branches. In some embodiments, analyzer 330 analyzes and/or otherwise evaluates input source code to identify and/or otherwise determine the relationship(s) between the nested loop code and, based on the foregoing, determine whether to fully unroll the inner loop for a particular number of iterations of the outer loop. For example, in inner loops with small iteration counts and/or short loop bodies, fully unrolling an initial quantity of iterations of the inner loop increases system performance by avoiding and/or reducing the impact of branch misprediction penalties. Basic unrolling retains the loop structure but reduces the number of iterations executed. In contrast, fully unrolling a loop eliminates the loop structure and replicates the code for the iterations as straight line code. In some embodiments, analyzer 330 of compiler 314 derives various types of information from input source code 316 to evaluate the inner and outer loops. One example of a loop structure 400 is shown in FIG. 4. The loop structure 400 illustrated in FIG. 4 has an outer loop having a loop index represented as "i=1:N" (where "i" is the outer loop induction variable) and an inner loop having a loop index represented as "j=1:i" (where "j" is the inner loop induction variable). As illustrated in FIG. 4, the upper bound of the inner loop has a direct correspondence to the loop index of the outer loop. In this example, the inner loop is bound in a linear relationship to the outer loop, thereby resulting in the inner loop having low iteration counts for the initial number of values of the induction variable of the outer loop. Thus, in some embodiments, analyzer 330 evaluates and/or otherwise analyzes the bounds or loop index relationship between the inner and outer loops to identify whether the inner loops may be candidates for being fully unrolled for an initial number of iterations of the outer loop (e.g., low iteration counts for an initial number of iterations of the outer loop).

In some embodiments, analyzer 330 evaluates the number or quantity of instructions in the inner loop and/or the size of code comprising the inner loop to determine whether to fully unroll the inner loop. For example, in loops with large loop bodies, the penalty or cost of the mispredicted branch diminishes with respect to the cost of execution of the loop body itself. Accordingly, analyzer 330 may evaluate the inner loop to determine the number of instructions in the inner loop and/or the processor cycles needed to execute the instructions of the inner loop to determine whether to fully unroll the inner loop. The number of instructions in the inner loop and/or the processor cycles needed to execute the instructions of the inner loop may be used to determine whether to fully unroll the inner loop and also to determine the quantity of iterations of the outer loop to fully unroll the inner loop.

Analyzer 330 analyzes the inner and outer loops and, in some embodiments, evaluates the derived information against one or more variables or thresholds to determine whether to fully unroll the inner loop and, if so, for how many iterations of the outer loop. For example, in the embodiment illustrated in FIG. 3, memory 206 includes an iteration count threshold 340, an instruction count threshold 342, a processor cycle threshold 344, and a fully unroll threshold 346. Iteration count threshold 340 may represent a threshold value for a quantity of iterations of an inner loop based on an outer loop index. Instruction count threshold 342 may represent a threshold value for a quantity of instructions in the inner loop. Processor cycle threshold 344 may represent a threshold value for a quantity of processor cycles needed to execute the instructions of an inner loop. Threshold 346 may represent a threshold value associated with a penalty or cost of a branch misprediction. For example, threshold 346 may represent a value indicating a processor cycle cost based on the processor cycles needed to execute the instructions of the inner loop plus the cost of a branch misprediction. Thus, if the processor cycles needed to execute the instructions of the inner loop is less than threshold 346 (i.e., less cost than the branch mispredict plus the cost of executing the inner loop iterations), a performance improvement may be obtained if the inner loops are fully unrolled.

Thus, in operation, analyzer 330 evaluates input source code 316 and, in response to identifying nested loop code, evaluates the loop index relationship between the inner and outer loops to determine whether the inner loop is a candidate for being fully unrolled. For example, if the inner loop in linearly bound to the loop index of the outer loop, the inner loop may have a relative small iteration count for an initial quantity of iterations of the outer loop. In some embodiments, analyzer 330 compares the number of iterations of the inner loop for one or more initial iterations of the outer loop to iteration count threshold 340. If the number of iterations of the inner loop for one or more initial iterations of the outer loop is less than iteration count threshold 340, analyzer 330 may determine to fully unroll the inner loop or identify the inner loop as a candidate for being fully unrolled.

Analyzer 330 may also evaluate the quantity of instructions in the inner loop and/or the processor cycles needed to execute the instructions of the inner loop and, if the quantity of instructions in the inner loop and/or the processor cycles needed to execute the instructions of the inner loop are less than instruction count threshold 342 and processor cycle threshold 344, respectively, analyzer 330 may determine to fully unroll the inner loop or identify the inner loop as a candidate for being fully unrolled. The various parameters of the inner and outer loops may be evaluated independently or in combination to determine whether to fully unroll the inner loop and, if so, for how many iterations of the outer loop. In some embodiments, analyzer 330 may evaluate the quantity of instructions in the inner loop and the processor cycles needed to execute the instructions of the inner loop against threshold 346. For example, if threshold 346 indicates a twenty-five processor cycle cost/penalty for a branch misprediction, an analysis of the instructions in the inner loop and the processor cycles needed to execute the instructions of the inner loop may result in less cost than the branch mispredict plus the cost of executing the inner loop iterations, thereby indicating a performance improvement if the inner loops are fully unrolled. This analysis may also be used to determine a quantity of iterations of the outer loop to fully unroll the inner loop. The thresholds 340, 342, 344 and 346 may be based on various heuristics, operating histories, performance data or other system evaluation criteria. It should also be understood that other criteria may be used to evaluate the inner and outer loops to determine whether to fully unroll the inner loop to reduce and/or avoid a branch misprediction penalty.

Figure 6:
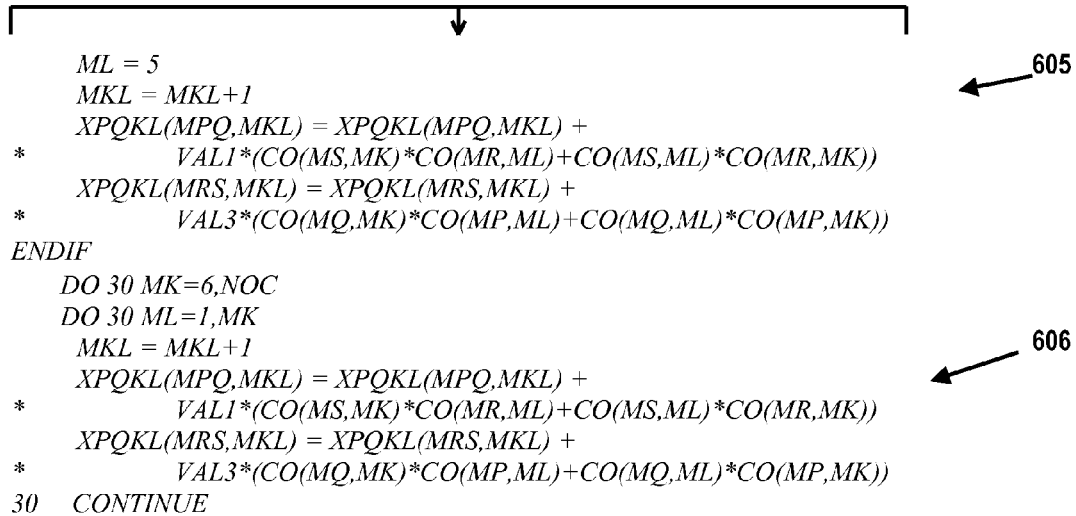
FIG. 6 is a diagram illustrating an exemplary embodiment of a transformed nested loop structure in accordance with the present disclosure.

Another example loop structure 500 is illustrated in FIG. 5. In the loop structure 500 of FIG. 5, irrespective of the value of "NOC," the inner loop has very low iteration counts for the first few values of the iteration index value "MK." In this particular loop structure 500, based on the data inputs and assuming that "NOC" has a value of "5" for each invocation of the routine, there are a significant number of mispredicts from this loop. In operation, for example, analyzer 330 may evaluate the inner and outer loop index relationship, the quantity of instructions of the inner loop and/or the processor cycles needed to execute the instructions of the inner loop and determine that the inner loop should be fully unrolled for five iterations of the outer loop. Using this example, FIG. 6 illustrates a transformation of the loop structure 500 by fully unrolling the inner loop for the first five iterations of the outer loop. In FIG. 6, reference numbers 601-605 represent the initial five iterations of the outer loop having a fully unrolled inner loop body, and reference number 606 represents the sixth and subsequent iterations of the outer loop without a fully unrolled inner loop.

Figure 7:
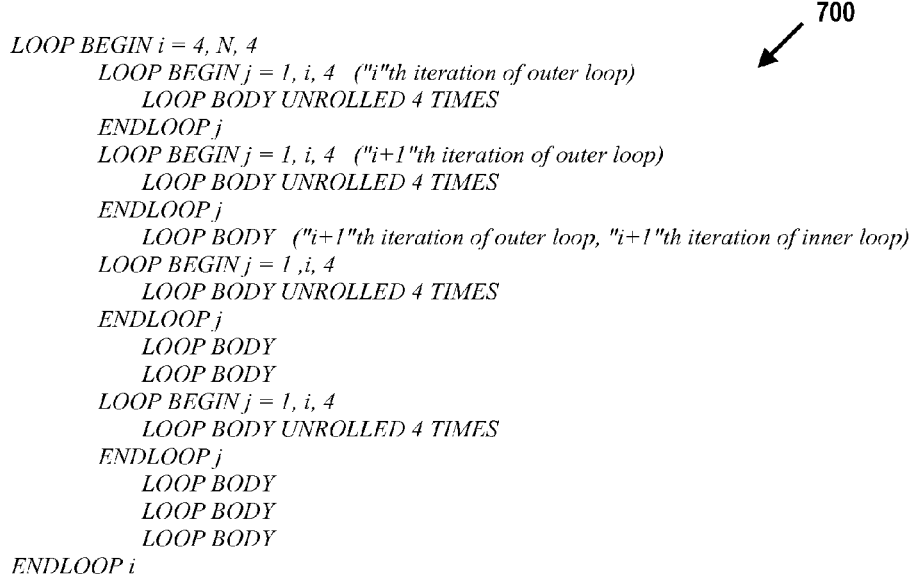
FIG. 7 is a diagram illustrating another exemplary embodiment of a transformed nested loop structure in accordance with the present disclosure.

FIG. 7 illustrates another optimization that may be performed by compiler 314 that avoids and/or reduces branch misprediction impact for the later iterations of the outer loop. In FIG. 7, a transformed loop structure 700 is illustrated for a double-nested loop where the inner loop induction variable j ranges from 1 to i. For example, the loop structure before optimization may be represented as:

loop i=1, N loop j=1, i

Typically, when a compiler generates optimized code for an inner loop, the compiler may unroll the outer loop a few times (e.g., governed by a parameter referred to as an unroll factor) to find independent instructions to schedule together (sometimes referred to as an "unroll and jam" technique). Most iterations of the inner loop are executed by this unrolled outer loop and any remaining iterations of the inner loop are executed by a "residue" loop where the inner loop is not unrolled. Because the residue loops do not contain unrolled code, the residue loops tend to be poorly scheduled and also suffer from misprediction penalties since the iteration counts are small. Thus, in the present disclosure, compiler 314 generates optimized residue loops for the inner loop by fully unrolling the residue loops.

For example, referring to FIG. 7, since the inner loop count is known for every iteration of the outer loop, the outer loop may be unrolled according to an unroll factor (e.g., four times in this example), and compiler 314 fully unrolls the residue loop in each of the inner loops. FIG. 7 illustrates the loop structure 700 with the inner loop unrolled four times. Referring to FIG. 7, the outer loop is unrolled four times and for each of the four inner loops, compiler 314 generates fully custom residue code by fully unrolling the residue loop. In FIG. 7, each instance of "loop body" represents a fully unrolled residue loop code. Thus, for example, when i=4, the residue loop would execute the "loop body" code zero times. When i=5, the residue loop would execute the "loop body" code one time. When i=6 and i=7, the residue loop would execute the "loop body" code two times and three times, respectively. These residue loop body codes correspond to the consecutive blocks of "loop body" in FIG. 7. It should be understood that these six isolated "loop body" code blocks could be merged to improve scheduling based on data dependency considerations. Similarly the four iterations of the original outer loop shown in FIG. 7 could be merged into one common loop since they share common upper and lower bound limits. In this example, for ease of illustration and description, assume that N is a multiple of four and larger than seven; otherwise residue code may be added for the unrolled outer loop.

Figure 8:
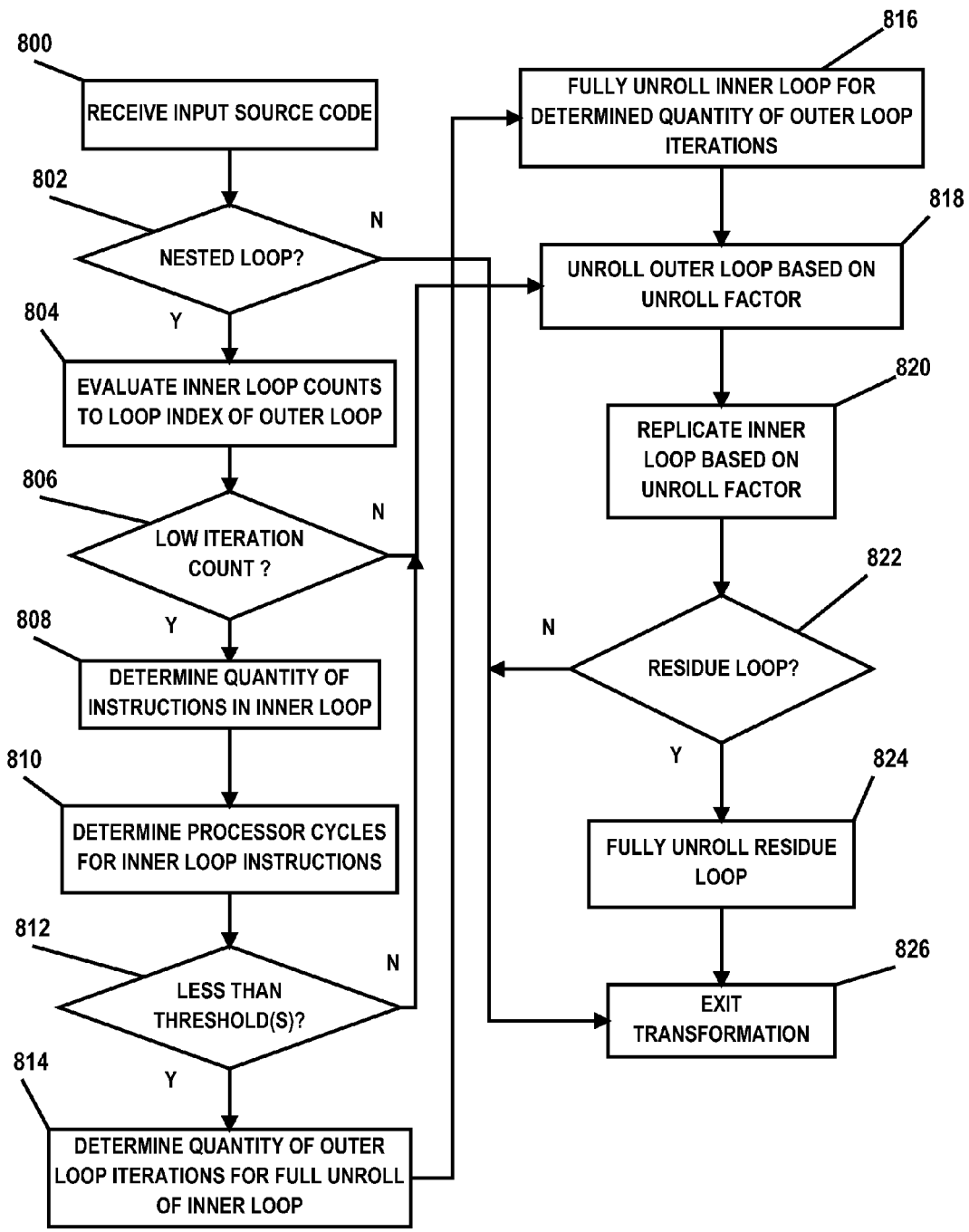
FIG. 8 is a flow diagram illustrating an embodiment of a method for reducing branch misprediction impact in nested loop code in accordance with the present disclosure.

FIG. 8 is a flow diagram illustrating an embodiment of a method for reducing branch misprediction impact for nested loop code. The method begins at block 800, where compiler 314 receives input source code 316. At decisional block 802, analyzer 330 determines whether the input source code 316 includes nested loop code. If not, the method proceeds to block 826, where compiler 314 exits the code transformation process. If input source code 316 includes nested loop code, the method proceeds to block 804, where analyzer 330 evaluates the loop index of the inner loop based on the loop index of the outer loop. At decisional block 806, analyzer 330 determines whether an iteration count for the inner loop is low and/or less than iteration count threshold 340 for an initial quantity of iterations of the outer loop. If not, the method proceeds to block 818. If the iteration count for the inner loop is low and/or less than iteration count threshold 340 for an initial quantity of iterations of the outer loop, the method proceeds to block 808.

At block 808, analyzer 330 evaluates the inner loop to determine a quantity of instructions in the inner loop. At block 810, analyzer 330 determines a quantity of processor cycles needed to execute the instructions of the inner loop. At decisional block 812, analyzer 310 determines whether the execution load for the inner loop is less than one or more thresholds (e.g., threshold 346, instruction count threshold 342 and/or processor cycle threshold 344). If not, the method proceeds to block 818. If so, the method proceeds to block 814, where analyzer 330 determines a quantity of outer loop iterations for fully unrolling the inner loop. At block 816, unroller 332 fully unrolls the inner loop for the determined initial quantity of iterations of the outer loop.

At block 818, unroller 332 further optimizes the input source code by unrolling the outer loop based on a particular unroll factor. At block 820, unroller 332 replicates the inner loop a quantity corresponding to the unroll factor. At decisional block 822, analyzer 330 determines whether, based on the unroll factor, residue loops remain. If not, the method proceeds to block 826. If so, the method proceeds to block 824, where unroller 332 fully unrolls the residue loops.

Thus, embodiments of the present disclosure increase system performance associated with nested loop code by avoiding and/or reducing the branch misprediction impact associated with nested code. For example, embodiments of the present disclosure identify inner loops that have a generally small number of iterations for an initial quantity of iterations of the outer loop and fully unroll the inner loop for the initial quantity of outer loop iterations. The unroll factor for unrolling the inner loop may be based on the number of instructions and execution workload for executing the inner loop instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for reducing branch misprediction impact in nested loops, comprising:
   responsive to identifying code having an outer loop and an inner loop, determining a quantity of iterations of the inner loop for an initial number of iterations of the outer loop;
   determining a number of processor cycles for executing the quantity of iterations of the inner loop for the initial number of iterations of the outer loop;
   determining whether the number of processor cycles is less than a threshold; and
   responsive to determining that the number of processor cycles is less than the threshold, fully unrolling the inner loop for the initial number of iterations of the outer loop.

2. The method of claim 1, further comprising:
   determining whether a loop index of the inner loop corresponds linearly to a loop index of the outer loop; and
   responsive to determining that the loop index of the inner loop corresponds linearly to the loop index of the outer loop, determining the quantity of iterations of the inner loop for the initial number of iterations of the outer loop.

3. The method of claim 1, further comprising:
   determining a quantity of instructions in the inner loop; and
   determining the initial number of iterations of the outer loop based on the quantity of instructions of the inner loop.

4. The method of claim 1, further comprising:
   identifying an induction variable of the outer loop;
   determining whether an induction variable of the inner loop is bound by the induction variable of the outer loop; and
   responsive to determining that the induction variable of the inner loop is bound by the induction variable of the outer loop, determining a quantity of iterations of the inner loop for an initial number of iterations of the outer loop.

5. The method of claim 1, further comprising generating an optimized residue loop of the inner loop.

6. The method of claim 1, further comprising fully unrolling a residue loop of the inner loop.

7. The method of claim 1, further comprising:
   unrolling the outer loop by an unroll factor;
   replicating the inner loop a quantity corresponding to the unroll factor;
   determining a quantity of residue loops of the inner loop based on the unroll factor; and
   fully unrolling the quantity of residue loops.

8. A system for reducing branch misprediction impact in nested loops, comprising:
   a processor;
   a computer-readable medium embodying program code, the program code comprising instructions executable by the processor and configured to:
      determine a quantity of iterations of the inner loop for an initial number of iterations of the outer loop;
      determine a number of processor cycles for executing the quantity of iterations of the inner loop for the initial number of iterations of the outer loop;
      determine whether the number of processor cycles is less than a threshold; and
      responsive to determining that the number of processor cycles is less than the threshold, fully unroll the inner loop for the initial number of iterations of the outer loop.

9. The system of claim 8, wherein the program code comprises instructions configured to:
   determine whether a loop index of the inner loop corresponds linearly to a loop index of the outer loop; and
   responsive to determining that the loop index of the inner loop corresponds linearly to the loop index of the outer loop, determine the quantity of iterations of the inner loop for the initial number of iterations of the outer loop.

10. The system of claim 8, wherein the program code comprises instructions configured to:
    determine a quantity of instructions in the inner loop; and
    determine the initial number of iterations of the outer loop based on the quantity of instructions of the inner loop.

11. The system of claim 8, wherein the program code comprises instructions configured to:
    identify an induction variable of the outer loop;
    determine whether an induction variable of the inner loop is bound by the induction variable of the outer loop; and
    responsive to determining that the induction variable of the inner loop is bound by the induction variable of the outer loop, determine a quantity of iterations of the inner loop for an initial number of iterations of the outer loop.

12. The system of claim 8, wherein the program code comprises instructions configured to:
    unroll the outer loop by an unroll factor;
    replicate the inner loop a quantity corresponding to the unroll factor;
    determine a quantity of residue loops of the inner loop based on the unroll factor; and
    fully unroll the quantity of residue loops.

13. A computer program product for reducing branch misprediction impact in nested loops, the computer program product comprising:
    a computer readable storage medium having computer readable program code embodied therewith, the computer readable program code comprising computer readable program code configured to:
       determine a quantity of iterations of the inner loop for an initial number of iterations of the outer loop;
       determine a number of processor cycles for executing the quantity of iterations of the inner loop for the initial number of iterations of the outer loop;
       determine whether the number of processor cycles is less than a threshold; and
       responsive to determining that the number of processor cycles is less than the threshold, fully unroll the inner loop for the initial number of iterations of the outer loop.

14. The computer program product of claim 13, wherein the computer readable program code is configured to:
    determine whether a loop index of the inner loop corresponds linearly to a loop index of the outer loop; and responsive to determining that the loop index of the inner loop corresponds linearly to the loop index of the outer loop, determine the quantity of iterations of the inner loop for the initial number of iterations of the outer loop.

15. The computer program product of claim 13, wherein the computer readable program code is configured to:
   determine a quantity of instructions in the inner loop; and
   determine the initial number of iterations of the outer loop based on the quantity of instructions of the inner loop.

16. The computer program product of claim 13, wherein the computer readable program code is configured to:
   identify an induction variable of the outer loop;
   determine whether an induction variable of the inner loop is bound by the induction variable of the outer loop; and
   responsive to determining that the induction variable of the inner loop is bound by the induction variable of the outer loop, determine a quantity of iterations of the inner loop for an initial number of iterations of the outer loop.

17. The computer program product of claim 13, wherein the computer readable program code is configured to:
   unroll the outer loop by an unroll factor;
   replicate the inner loop a quantity corresponding to the unroll factor;
   determine a quantity of residue loops of the inner loop based on the unroll factor; and
   fully unroll the quantity of residue loops.

18. A computer-implemented method for reducing branch misprediction impact in nested loops, comprising:
   responsive to identifying code having an outer loop and an inner loop, determining whether an iteration count of the inner loop for an initial number of iterations of the outer loop is less than an iteration threshold;
   responsive to determining that the iteration count of the inner loop for the initial number of iterations of the outer loop is less than the threshold, unrolling the outer loop by an unroll factor;
   replicating the inner loop a quantity corresponding to the unroll factor;
   determining whether a residue inner loop remains based on the unroll factor and an upper bound of the inner loop; and
   responsive to determining that a residue inner loop remains, fully unrolling the residue inner loop.

19. The method of claim 18, further comprising: determining a quantity of instructions of the inner loop; and
   responsive to determining that the quantity of instructions of the inner loop is less than a threshold instruction count value, fully unrolling the inner loop for an initial number of iterations of the outer loop.

20. The method of claim 19, further comprising:
   determining a quantity of processor cycles to execute the quantity of instructions of the inner loop; and
   determining the initial number of iterations of the outer loop to fully unroll the inner loop based on the quantity of processor cycles.

* * * * *